United States Patent [19]

Persson

[11]  4,173,005
[45]  Oct. 30, 1979

[54] POSITION INDICATOR

[75] Inventor: Bengt A. Persson, Gnosjö, Sweden

[73] Assignee: Jochnick & Norrman AB, Varnamo, Sweden

[21] Appl. No.: 893,914

[22] Filed: Apr. 6, 1978

[30] Foreign Application Priority Data

Apr. 14, 1977 [SE] Sweden ................................ 7704287

[51] Int. Cl.² ............................................ H01C 10/28
[52] U.S. Cl. .................................... 338/158; 338/196; 338/202
[58] Field of Search ................ 338/157, 158, 202, 153, 338/108, 196, 302, 316, 318, 324–326, 331, 333, 334, 209, 218, 267

[56] References Cited

U.S. PATENT DOCUMENTS

| | | | |
|---|---|---|---|
| 2,139,217 | 12/1938 | Aiala | 338/153 X |
| 2,681,586 | 6/1954 | Pressler | 338/153 X |
| 4,006,441 | 2/1977 | Goodrich | 338/153 |

Primary Examiner—C. L. Albritton
Attorney, Agent, or Firm—Pollock, Vande Sande & Priddy

[57] ABSTRACT

A position indicator of potentiometer type includes two parallel wires, each having first and second ends, and a movable, rotatable contact cylinder around which the wires pass round at least one turn. The potential contact is made via the first end of a first wire and the second end of a second wire, whereas the potentiometer current is arranged, when in use, via a second end of said first wire and a first end of said second wire, the two being coupled through the contact cylinder.

3 Claims, 4 Drawing Figures

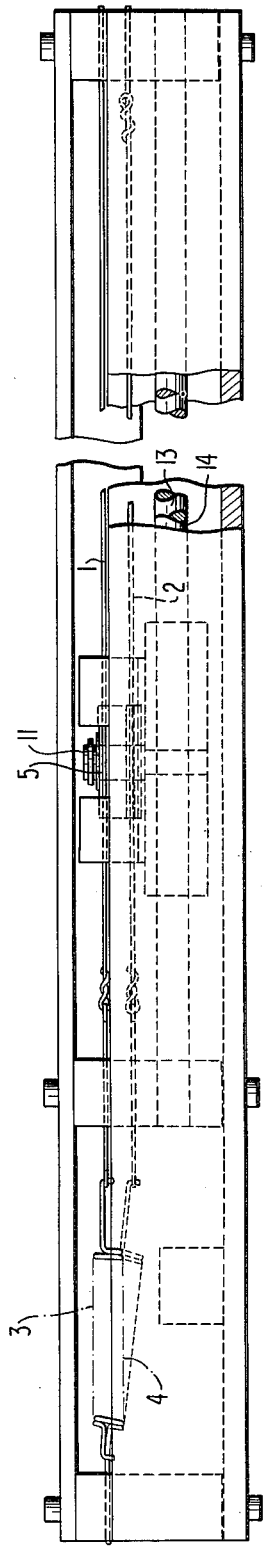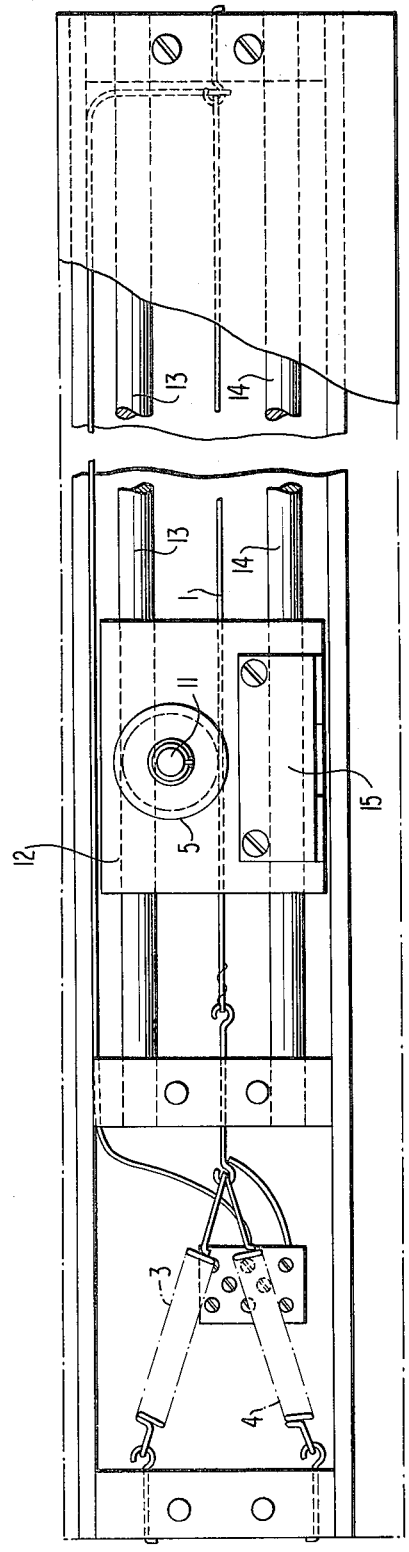
FIG 2
FIG 3

POSITION INDICATOR

The invention relates to an electrical position indicator of the potentiometer type.

Although it is not often constructed in this manner in practice, the pedagogical picture of the Wheatstone bridge is a wire, against which lies a movable contact, which is coupled to the zero indicator. Those skilled in the art are aware that precision bridges are not presently made by means of such resistance wires, but rather with sets of resistors which can be regulated in fixed steps. The same is true of precision potentiometers.

However, the original resistance wire in older versions of the Wheatstone bridge has come into use as a position indicator. It is of course not coupled as a Wheatstone bridge but as a potentiometer. A voltage is applied between the ends of the wire, so that an evenly distributed drop in voltage is obtained over the same. If the drop in voltage is then measured from one end to a movable contact (without drawing any current through the contact), a value is obtained which varies linearly with the displacement of the movable contact, provided that the wire is of uniform gauge.

A disadvantage of such a level indicator is that it is often difficult to achieve satisfactory contact between the wire and the movable contact. As troublesome as such difficulties can be under laboratory conditions, they are even more so under operating conditions, e.g., in a factory or shop, where it can be difficult to protect the wire adequately against various contaminants.

It is known to improve the contact between the moving contact and the wire in such devices by winding the wire once or twice around a pin or cylinder serving as a contact member, which is usually rotatable so that it rotates and rolls forward on the wire when its support or "carriage" is moved along the same.

It is a purpose of the invention to achieve an improved position indicator of potentiometer type of this generally described type.

The invention will now be described with reference to an embodiment illustrated in the accompanying drawings.

FIGS. 2 and 3 are partly sectioned side and plan views, respectively, of a position indicator according to the invention.

Figure 1:
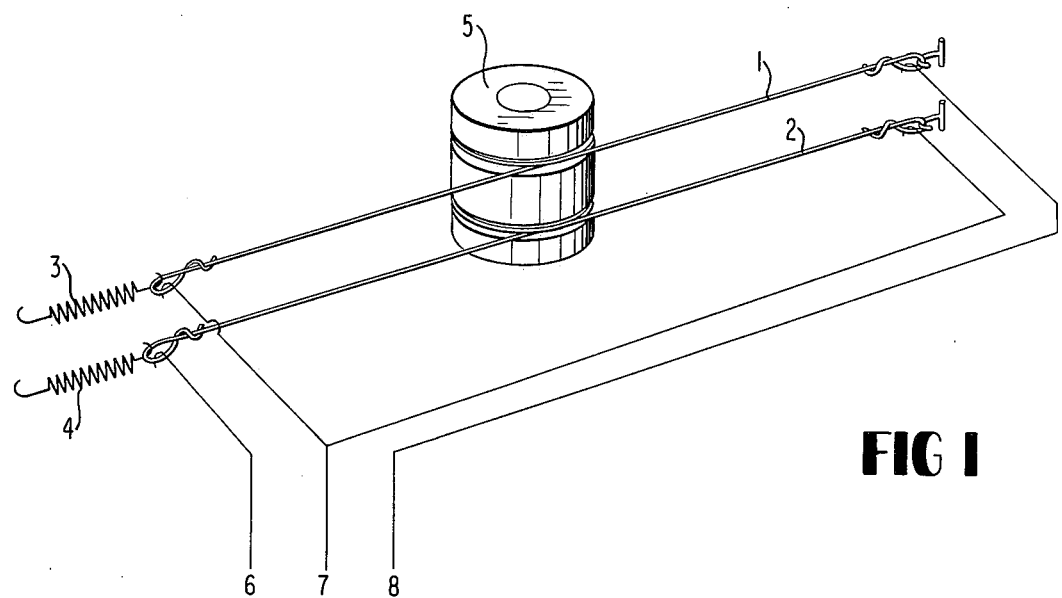
FIG. 1 is a schematic diagram, showing the functioning of the invention.
Figure 4:
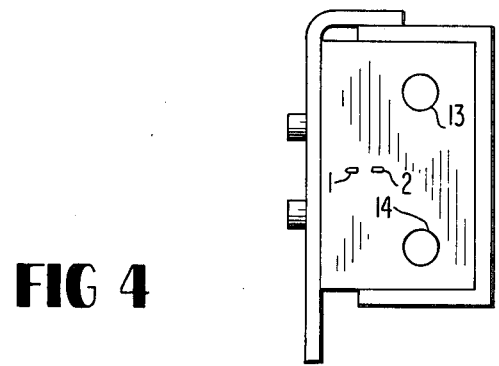
FIG. 4 is an end view of the position indicator of FIGS. 2 and 3.

As will be evident from FIG. 1, the level indicator comprises two wires 1 and 2. One end of each is fixed and the other end is attached to a tension spring 3 and 4, respectively. The parallel wires are furthermore wound once around a contact drum 5, in grooves cut in the outside surface of the drum. If the wires were wound on a cylindrical surface, they would travel in one direction or the other as the drum is turned to displace it along the wires. If there were no obstruction, the wires would be displaced by the pitch distance for each turn of the drum. By retaining the wires in grooves, the corresponding slippage in the grooves serves to achieve metallic contact.

As seen from FIG. 1, coupling wires are coupled to the ends of wires 1 and 2. The spring end of wire 2 and the fixed end of the wire 1 are individually clamped as at 6 and 8, respectively. The remaining connecting points on the wires, namely, the fixed end of wire 2 and the spring end of wire 1, are coupled to the same clamping screw 7.

In the potentiometer circuit or the like for which the device according to FIG. 1 is intended, a current is set up between clamping screws 6 and 8, producing a current which passes via the spring end of wire 2, via contact drum 5 over to wire 1 and from there on to its fixed end and on to clamping screw 8. It can also be seen that the contact point, at contact drum 5, is sensed as to its potential via clamping screw 7.

This circuit provides a number of advantages. Firstly, there is no need for a loose cable or particular switch-in device to the contact point. Secondly, there is a safe metallic contact in the contact point, which is a great advantage since tottering contact due to vibrations, for example, is eliminated as long as there is any current at all in the "potentiometer." The "low-ohm" portion of the system thus guarantees contact for the "high-ohm" portion, thereby eliminating many causes of error.

It will be apparent that the high-ohm portion of the system is freed of problems such as contact resistance, charging effects and continuity problems. A number of causes of thermoelectromotive forces are also eliminated.

The embodiment is shown in more detail in FIGS. 2 and 3. The wires 1 and 2 are mounted in a type of box made of aluminum profiles with plastic ends, and the contact cylinder 5 is rotatable about a shaft 11, which is fixed to a plastic slide 12. Slide 12 is slidably arranged on a pair of rods of drill rod 13 and 14 which extend parallel to the wires 1 and 2. The slide will thus be movable along a path with precision bearings. A fork-shaped driver 15 is fixed to slide 12. This driver is accessible through a slot in the box, so that a bar, for example, can be set in the fork. The bar can be a portion of a machine part or the like whose linear displacement is to be measured with the aid of the position indicator.

While FIGS. 2 to 3 do not show in detail how an electrical junction is made to clamping screws corresponding to clamping screws 6, 7 and 8 of FIG. 1, no particular skill is needed to arrange this detail after inspection of FIG. 1. It is thus evident that the wording "clamping screw" should be broadly construed, being a convenient expression for any means by which the wires may be coupled to well-known measuring apparatus or the like.

In the embodiment shown, the wires are 0.25 mm music wire. The contact cylinder has an external diameter of 33 mm, and is of brass and is slide journalled on a 10 mm shaft. Manufactured versions were made with measuring intervals of lengths varying between 200 and 1500 mm, which proved to function well.

What I claim is:

1. Electrical position indicator of the potentiometer type, with a resistance in the form of a uniform wire (1, 2) having a movable contact comprising a contact cylinder (5) disposed on a slidable slide (12), the wire being wound at least one turn about said contact cylinder, said indicator comprising
   (a) two parallel wires (1, 2) which are wound in the same direction and at different heights about said contact cylinder;
   (b) a first one (1) of said wires being coupled at one end to a first clamping screw (8) and at its opposite end to a contact clamping screw (7) for sensing the potential of said movable contact;
   (c) a second one of said wires having one end corresponding to said first end of said first wire and located adjacent to the same, coupled to said contact clamping screw (7) and its opposite end to a second clamping screw (6);

(d) said first and second clamping screws being supplied with potentiometer current.

2. Position indicator according to claim 1, wherein said two wires (1, 2) are wound in individual grooves in said contact cylinder (5).

3. Position indicator according to claim 1 or 2, wherein said wires are of steel and are fixed at one end and stretched by individual springs (3, 4) at the other.